(No Model.)

J. R. McALISTER & T. W. WADDELL.
COTTON SCRAPER.

No. 477,691. Patented June 28, 1892.

Witnesses:

Inventors
James R. McAlister
Thomas W. Waddell,
By their Attorneys,

UNITED STATES PATENT OFFICE.

JAMES R. McALISTER AND THOMAS W. WADDELL, OF CLINTON, ARKANSAS.

COTTON-SCRAPER.

SPECIFICATION forming part of Letters Patent No. 477,691, dated June 28, 1892.

Application filed December 24, 1891. Serial No. 416,075. (No model.)

*To all whom it may concern:*

Be it known that we, JAMES R. MCALISTER and THOMAS W. WADDELL, citizens of the United States, residing at Clinton, in the county of Van Buren and State of Arkansas, have invented a new and useful Cotton-Scraper, of which the following is a specification.

This invention relates to improvements in cotton scrapers or plows; and the objects in view are to provide a scraper of cheap and simple construction the beams of which are readily adjustable; to provide cheap and convenient feet for securing the shovels or scrapers to the lower ends of the beams; to adapt the same for lateral adjustment, whereby various inclinations may be given the shovels, and finally to provide simple devices for securing the shovels to the feet, whereby the same may be vertically adjusted by the manipulation of but one bolt.

With the above objects in view the invention consists in certain features of construction hereinafter specified, and particularly pointed out in the claim.

Figure 1:
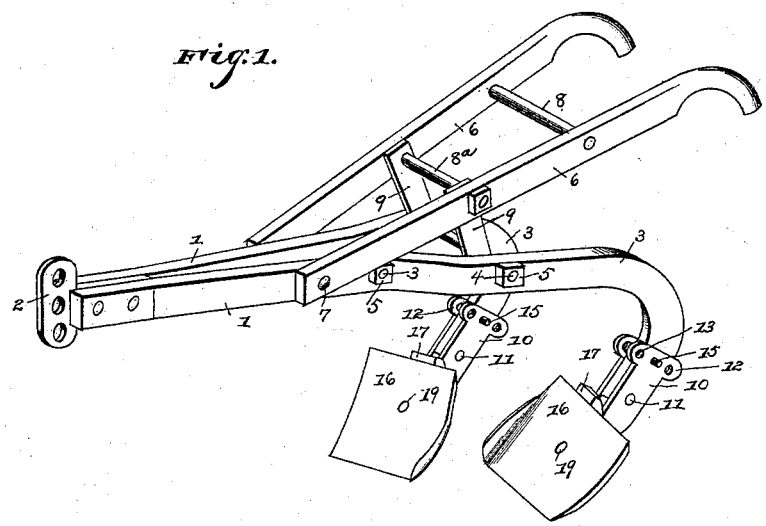
Figure 2:
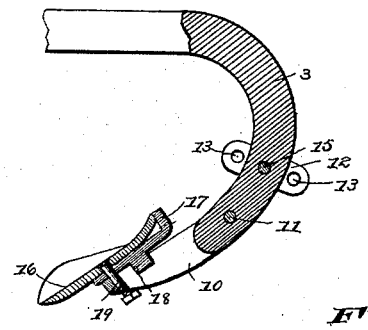
Figure 3:
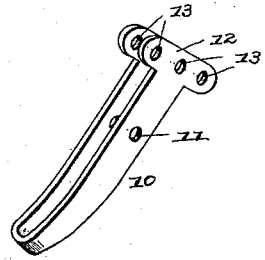
Figure 4:
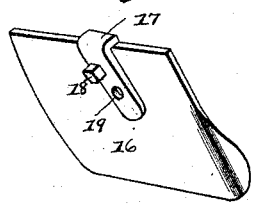

Referring to the drawings, Figure 1 is a perspective of a cotton-scraper constructed in accordance with our invention. Fig. 2 is a vertical section through the rear end of one of the beams, the foot, and scraper-fastening. Fig. 3 is a detail in perspective of one of the feet. Fig. 4 is a similar view of one of the scrapers, illustrating the fastening employed for securing the same to the foot.

Like numerals of reference indicate like parts in all the figures of the drawings.

1 designates the opposite beams, which are bolted at their front ends to and embrace an ordinary clevis 2. The beams are preferably formed of bar-iron, and after extending rearwardly a short distance and slightly diverging they are more abruptly diverged or spread and terminate in goose-neck standards 3. In front and in rear of their bends the beams are connected by tie-rods 4, which are threaded near their ends and have applied thereto at the opposite sides of each beam adjusting-nuts 5, which, being properly manipulated, will serve to spread or contract the two beams.

Handles 6 have their front ends bolted, as at 7, to the outer sides of the two beams, are connected by the usual rung 8, and are in this instance braced by a pair of braces 9, the lower ends of which are mounted on the tie-rods and the upper ends of which are perforated to receive the bolts 8ª.

10 designates a U-shaped plow-foot, the same being preferably formed of bar-iron bent upon itself at the center, whereby the opposite bifurcations are formed. Two plow-feet are employed, one for each of the goose-neck standards, which standards are received between the bifurcations of their respective feet. The feet are pivoted, as at 11, at their centers to the lower ends of the standards, and at their upper ends are flared or widened to form heads 12, each of which is provided with adjusting-openings 13, adapted to coincide with the perforation formed in the adjacent standard and concentric with the pivoting-bolt that connects the foot to the standard. Ordinary brake-pins 15 may be passed through any pair of the adjusting-perforations of the feet and the opening in the standard, whereby it will be obvious that the feet may be set at various inclinations, and, being provided with shovels or scrapers, as will be hereinafter seen, will thereby maintain the same at a proper angle for penetration. In case the scrapers should meet with such obstructions as would be calculated to injure them the brake-pin would yield, thus liberating the foot and obviating such accident.

16 designates the scrapers, which have their inner edges turned, as is usual. Inverted-L-shaped fastenings 17—one for each scraper—are located upon the upper edge thereof, and each is provided upon its rear side with a square or angular tenon 18, which fits and moves within the slot or space between the bifurcations of that foot to which it is secured. Such security is effected by means of a single bolt 19, passed through each of the scrapers, the lower end of the metal fastening, and the bifurcation of the foot to which the scraper is secured, the nut of the bolt being in rear of the foot and overlapping the edges of the bifurcation in the latter.

The bolt serves to secure the fastening or casting upon the scraper, the shape of the fastening being such as to prevent its turning, and the tenon extending from the rear face of fastening takes within the slot in the foot, preventing the shovel from turning, yet permitting a vertical movement, and the bolt, in addition to securing the fastening to the scraper, serves to secure the scraper and fastener to the foot.

From the foregoing description, in connection with the accompanying drawings, it will be seen that we have provided a cheap and simply-constructed cotton scraper or plow the blades of which may be inclined as desired, and are readily adjustable vertically, the latter being accomplished by a single bolt.

Having described our invention, what we claim is—

In a cotton-scraper, the combination, with the plow-beams terminating at their rear ends in goose-neck standards and the bifurcated U-shaped feet embracing and having their terminals between their ends pivoted to the standards and provided at their upper ends above their points of pivots with transverse heads, any pair of the perforations of which are adapted to be thrown into register with perforations formed in the standards, brake-pins passed through the perforations in the standards and feet, and opposite scrapers having their inner edges forwardly bent, of inverted-L-shaped fasteners located upon the upper edges and at the backs of the scrapers, each of said fasteners being provided upon its rear side at a point near its middle with a rearwardly-disposed rectangular tenon fitting the slot of the foot below the plow-standard, and bolts passed through the scrapers, the lower ends of the fasteners below the tenons, and through the slots of the feet, whereby the fasteners may be vertically adjusted within the feet, substantially as specified.

In testimony that we claim the foregoing as our own we have hereto affixed our signatures in the presence of two witnesses.

JAMES R. McALISTER.
THOS. W. WADDELL.

Witnesses:
J. W. PATE,
W. J. PATE.